(12) United States Patent
Francia et al.

(10) Patent No.: US 12,453,948 B2
(45) Date of Patent: Oct. 28, 2025

(54) PARTICLE PROCESSING

(71) Applicant: UCL BUSINESS LTD, London (GB)

(72) Inventors: Victor Francia, London (GB);
Marc-Olivier Coppens, London (GB)

(73) Assignee: UCL BUSINESS LTD, London (GB)

( * ) Notice: Subject to any disclaimer, the term of this patent is extended or adjusted under 35 U.S.C. 154(b) by 0 days.

(21) Appl. No.: 18/248,609

(22) PCT Filed: Oct. 11, 2021

(86) PCT No.: PCT/GB2021/052620
§ 371 (c)(1),
(2) Date: Apr. 11, 2023

(87) PCT Pub. No.: WO2022/079420
PCT Pub. Date: Apr. 21, 2022

(65) Prior Publication Data
US 2023/0372890 A1   Nov. 23, 2023

(30) Foreign Application Priority Data
Oct. 13, 2020 (GB) ..................................... 2016253

(51) Int. Cl.
*B01J 8/22* (2006.01)
*B01J 2/00* (2006.01)

(52) U.S. Cl.
CPC ................. *B01J 8/22* (2013.01); *B01J 2/006* (2013.01); *B01J 2208/00566* (2013.01); *B01J 2208/0084* (2013.01); *B01J 2208/00938* (2013.01)

(58) Field of Classification Search
CPC .... B01J 8/22; B01J 2/006; B01J 2208/00566; B01J 2208/0084; B01J 2208/00938; B01J 10/002; B01J 2219/009; B01J 19/241; B01J 8/40
See application file for complete search history.

(56) References Cited

U.S. PATENT DOCUMENTS

| | | | | |
|---|---|---|---|---|
| 6,333,019 | B1 * | 12/2001 | Coppens | B01F 35/7182 |
| | | | | 261/DIG. 70 |
| 7,619,011 | B1 * | 11/2009 | Gamwo | B01J 8/22 |
| | | | | 518/700 |
| 2018/0056261 | A1 * | 3/2018 | Schuessler | B01J 2/006 |

FOREIGN PATENT DOCUMENTS

| | | | | |
|---|---|---|---|---|
| EP | 0390495 | A2 * | 10/1990 | B01J 8/40 |
| EP | 3730218 | A1 * | 10/2020 | B01J 19/006 |

OTHER PUBLICATIONS

Higham et al., "On the Dynamics of a Quasi-Two-Dimensional Pulsed-Fluidized Bed," Arxiv.org, Cornell University Library, Sep. 13, 2018. (Year: 2018).*
Pence et al., "Chaos suppression in gas-solid fluidization," Chaos, vol. 8, No. 2, 1998, 514-519. (Year: 1998).*
Cheng et al., "Control of Chaotic Dynamics in 2-D Fluidized Bed by Periodic Gas Injection," AIChE (1999). (Year: 1999).*

(Continued)

*Primary Examiner* — William P Fletcher, III
(74) *Attorney, Agent, or Firm* — Vorys, Sater, Seymour and Pease LLP (57) ABSTRACT

A method of operating a gas-solid fluidized bed (130) includes-flowing a pulsating gas flow upwards through a bed of solid particles from a distributor (104) to cause a dynamically structured bubble flow (130), and processing particles using the fluidized bed.

16 Claims, 9 Drawing Sheets

(56) References Cited

OTHER PUBLICATIONS

Van den Bleek et al., "Application of chaos analysis to multiphase reactors," Chemical Engineering Science 57 (2001) 4763-4778. (Year: 2001).*
Coppens et al., "Pulsation induced transition from chaos to periodically ordered patterns in fluidized beds," (2002). (Year: 2002).*
Coppens et al., "Structuring chaotic fluidized beds," Chemical Engineering Journal 96 (2003) 117-124. (Year: 2003).*
Viduka et al., "CFD-DEM investigation of particle separations using a trapezoidal jigging profile," 9th Int'l Conf. on CFD in the Minerals and Process Indus. (2012). (Year: 2012).*
Bizahem et al., "Experimental study on hydrodynamic characteristics of gas-solid pulsed fluidized bed," Powder Technology 237 ( 2013) 14-23. (Year: 2013).*
Viduka et al., "CFD-DEM investigation of particle separations using a sinusoidal jigging profile," Advanced Powder Technology 24 (2013) 473-481. (Year: 2013).*
Wu et al., "Pattern formation in fluidized beds as a tool for model validation: A two-fluid model based study," Powder Technology 295 (2016) 35-42. (Year: 2016).*
Wu et al., Pattern formation in pulsed gas-solid fluidized beds—The role of granular solid mechanics, Chemical Engineering Journal 239 (2017) 4-14. (Year: 2017).*
Francia et al., "Dynamic particle clustering in pulsed gas-solid fluidized beds: A study of mesoscopic granular structures," The 25th Int'l Symposium on Chemical Reaction Engineering (2018), 2 pages. (Year: 2018).*
Martin et al., "Universal stability curve for pattern formation in pulsed gas-solid fluidized beds of sandlike particles," Physical Review Fluids 3, 034303 (2018). (Year: 2018).*
Higham et al., "On the Dynammics of a Quasi-Two-Dimensional Pulsed-Fluidized Bed," arXiv: 1809.05033v1 [physics, flu-dyn] Sep. 13, 2018. (Year: 2018).*
Higham et al., "Using a proper orthogonal decomposition to elucidate features in granular flows," Granular Matter (2020) 22:86. (Year: 2020).*
Chen, Kaicheng, Modeling and Validation of Particle Drying and Coating in a Continuously Operated Horizontal Fluidized Bed, Dissertation (2020). (Year: 2020).*
Application details for GB 2016253.3 as retrieved from the UK Intellectual Property Office on Feb. 26, 2025, 1 page. (Year: 2025).*
J. Ruud van Ommen et al., "Fluidization of nanoparticles: a review," J Nanopart Res (2012) 14:737. (Year: 2012).*
Written Opinion and International Search Report for corresponding PCT Application No. PCT/GB2021/052620 mailed Jan. 3, 2022.
Jonathan E Higham et al, "On the Dynamics of a Quasi-Two-Dimensional Pulsed-Fludized Bed", arxiv.org, Cornell University Library, 201 Olin Library Cornell University Ithaca, NY 14853,Sep. 13, 2018 (Sep. 13, 2018).
Francia, Victor et al, "Dynamic particle clustering in pulsed gas-solid fluidized beds: A study of mesoscopic granular structures", May 20, 2018 (May 20, 2018), p. 1-2.
Wu Kaiqiao et al, "Pattern formation in fluidized beds as a tool for model validation: A two-fluid model based study", Powder Technology, vol. 295, Jul. 1, 2016 (Jul. 1, 2016), p. 35-42.
Wu Kaiqiao et al, "Pattern formation in pulsed gas-solid fluidized beds—The role of granular solid mechanics", Chemical Engeneering Journal, vol. 329, Dec. 1, 2017 (Dec. 1, 2017), p. 4-14.

* cited by examiner

Figure 4 a) Unstructured pulsation - Low $f$ b) Unstructured pulsation - High $f$

PARTICLE PROCESSING

FIELD OF THE INVENTION

The present invention relates to fluidized beds, and to methods of operating fluidized beds.

BACKGROUND

Fluidization excels as a way to put fluids and solids in intense contact. It is used in applications where homogeneous mixing, heat and mass transfer are important, such as dryers or multiphase reactors, e.g., for gasification, polymerization or fluid catalytic cracking (FCC). Despite widespread application, many aspects of the operation and scale-up of fluidized beds are still troublesome. Most materials are hard to fluidize uniformly. Coarse particles receive too little energy, due to their low surface area to volume ratio. Fine particles are too cohesive, and in many practical scenarios flowability is hindered by the presence of liquid binders. The rheology of a gas-solid suspension is affected by a broad range of interparticle forces that are hard to quantify and are highly dependent on materials and process conditions. Furthermore, its hydrodynamics are inherently unstable. Mixing is caused by flow structures covering a wide range of spatial and temporal scales and, unlike single-fluid turbulent flow, the interplay of hydrodynamic and interparticle forces creates a variety of complex flow features, which are very challenging to predict using current computational tools. Most are scale-dependent, and the behaviour of a lab-scale unit can differ drastically from a pilot unit, let alone a full-scale industrial bed. Given this level of complexity, it has been common to regard a gas-solid fluidized bed as an idealized suspension under an instability or to describe it as a deterministic chaotic system, in which a small disturbance, such as a fluctuation in upstream gas flow or packing, can degenerate into completely different hydrodynamics. This makes reliable scale-up and robust control of real units very difficult.

The performance of a bed depends on the contact pattern between gaseous and solid species. Mixing and residence time vary drastically between different designs, raw materials and scales. In a suspension of Geldart B particles, the solid motion is affected by the formation of bubbles. A rising bubble conveys the solids up and towards the center, after which solids recirculate downward near the walls. This improves gas-solid contact, because the solids mix inside the bubble wakes, but, while large bubbles create mixing, they also allow part of the gas to bypass the solid phase, thus reducing the time available for reaction or interfacial transport. Designing a fluidized bed involves compromises between vigorous mixing and sufficient contact time (between the solid and gas phases), by optimizing bubble size and velocity.

While the bubble dynamics are scale-dependent and hard to predict, there are various ways to alter the overall hydrodynamics to improve particular processes. These include altering the interparticle forces by adding flow-conditioning particles, liquid binders, adsorption of gas and changes to the operating conditions. In some cases, fluid viscosity and density can be modified to alter the flow regime by adequate selection of the gas, temperature and pressure, and even working under supercritical conditions, common in the pharmaceutical and energy sectors. There are also many ways to supply an additional source of energy in so-called "assisted fluidization" technologies, for example with direct solar irradiation, using microwaves in fast biomass pyrolysis, or introducing radio frequency and ultrasound in the design of fluidized bed dryers.

Such changes to materials, process conditions or environment can drastically increase gas-solid contact, for example, by reducing bubble size or stopping a cohesive powder from channeling, and thus improve performance and reduce uncertainty in fluidized bed design and scale-up. However, rather than a fundamentally new design, they offer a range of ad hoc, often empirical solutions to improve the efficiency of specific processes.

Alternatively, one can try to overcome the disadvantages of traditional fluidization with more fundamental design changes. Instead of allowing the hydrodynamic instability to degenerate into uncontrolled chaos, one can try to suppress or contain this degeneration. Here, one seeks to modify key aspects of the design, using additional degrees of freedom to create a "structured fluidized bed" where the flow has a much higher degree of predictability or is, at least, more homogeneous and scalable.

One method for causing structuring of a fluidized bed is to oscillate the superficial inlet gas velocity—also referred to as gas pulsation.

SUMMARY

According to a first aspect of the invention, there is provided a method of operating a gas-solid fluidized bed, comprising: i) flowing a pulsating gas flow upwards through a bed of solid particles from a distributor to cause a dynamically structured bubble flow; ii) processing particles using the fluidized bed.

A dynamically structured bubble flow may be defined as having a self-organised, spatially periodic bubble pattern. In some embodiments the spatially periodic bubble pattern may be responsive to parameters of the pulsating gas flow, so that a pitch and/or bubble size may be responsive to a frequency, amplitude or flow rate (e.g. minimum or mean flow rate) of the pulsating gas flow.

A dynamically structured bubble flow may provide a number of advantages, including: i) effective mixing at low gas flow rates; ii) compartmentalised flow, with mixing by two mechanisms, namely, axial mixing within the compartment and controlled advection between compartments; iii) scalability and responsiveness (in that properties of the bed can be altered by adjusting gas flow parameters).

The plurality of mixing compartments may be arranged in a triangular bubble tessellation. Bubbles may be formed in a sequence of horizontal arrays or lines (curved or straight), with the bubbles in each line uniformly spaced apart. Bubbles in successive lines may be offset from the preceding row, for example by half of the distance between each bubble in the preceding line, so as to define a triangular tessellation between bubbles in successive lines.

Processing particles using the fluidized bed may comprise setting up a compartmentalised flow regime, in which a plurality of mixing compartments is defined between adjacent bubbles. Particles may be mixed by a combination of: i) recirculating axial mixing (i.e. axial mixing with respect to the bubble path) within the compartment; and ii) the controlled advection of particles between compartments.

The residence time within the compartment for the axial mixing may be between 0.1 s and 200 s. The rate of advection of particles between compartments may have a time averaged rate of between 0.01 and 250 litres$_{solid\ particles}$/m$^2$·s.

The residence time within the compartment for the axial mixing may be between 1 s and 20 s. The rate of advection of particles between compartments may have a time averaged rate of between 0.1 and 25 litres$_{solid\ particles}$/m$^2$·s.

The mixing locally within a compartment may comprise mixing with a quasi-static granular flow region in the wake of each bubble defining the mixing compartment. This quasi-static granular flow region may be created by providing a pulsed gas flow with a minimum superficial gas velocity that is below the minimum fluidization velocity, and a maximum superficial gas velocity that is above the minimum fluidization velocity.

The method of any preceding claim, wherein processing the particles comprises controlling gas-solid contact time by adjusting the spacing and size of gas bubbles, so that the standard deviation of the bubble size is less than 20% (or less than 30% or less than 50%) of the median bubble size and the standard deviation of the bubble spacing in the fluidized bed is less than 40% (or less than 100% or less than 200%) of the median bubble size.

Processing the particles may comprise controlling gas-solid contact time by adjusting the pitch and size of gas bubbles arranged in a triangular tessellation. The linear span of the area-based distributions of the bubble size and the horizontal spacing between adjacent bubbles in the fluidized bed may be less than 1.5 and 1.75, respectively. Here, linear span is defined as $(p_{90}-p_{10})/p_{50}$, where $p_{90}$, $p_{10}$ and $p_{50}$ refer to the 90$^{th}$, 10$^{th}$ and 50$^{th}$ percentile of the distribution. The time averaged exchange rate between an emulsion phase of the fluidized bed and the bubble phase of the fluidized bed may be between 5 and 50 litres$_{solid\ particles}$/m$^2$ s, or between 0.1 and 500 litres$_{solid\ particles}$/m$^2$ s.

Processing the particles may comprise controlling the stress experienced by each particle by adjusting the horizontal spacing between gas bubbles, and the mean diameter of gas bubbles, so that the standard deviation of stress experienced by each particle in the bed is less than 50% of the median stress. The standard deviation of stress experienced by each particle in the bed may be less than 40%, 30% or 20% of the median stress.

The bed may comprise or consist of one or more quasi-2D beds. The bed may be provided with one or more baffles that divide the bed into a plurality of vertical particle bed portions, wherein each bed portion has a thickness, normal to the baffle, thinner than a depth of the bed portion. Each bed portion may be quasi-two dimensional.

The thickness of each bed may be less than ten times a mean bubble diameter. The thickness of each bed may be less than twice the horizontal spacing between bubbles.

A lateral extent, normal to the thickness, along the horizontal direction, of the quasi two-dimensional particle bed portion may be at least five times the thickness of the bed portion and/or a depth of the quasi two-dimensional particle bed portion may be at least five times the thickness of the bed portion.

The one or more baffle may each be curved or flat.

The one or more baffle may each extend through only part of the depth of the bed.

The one or more baffle may each extend downwards from the top surface of the bed.

The method may further comprise adding a liquid to the fluidized bed. The particle processing may comprise contacting the particles with the liquid.

Adding a liquid may comprise spraying of a liquid onto the fluidized bed. In some embodiments the spraying may be top-down spraying, but this is not essential.

The liquid may comprise a binder or a coating material.

The method may further comprise introducing solid particles to the bed while the bed is fluidized, and/or recovering processed particles from the bed while the bed is fluidized.

The method may comprise adding solid particles, which are added in a central region of a rectangular fluidized bed, and/or lateral positions following the advection of particles from the centre outwards and/or processed particles are recovered at an edge region of the fluidized bed.

Processing particles may comprise adjusting gas flow (e.g. constant or pulsating) to manipulate the flow regime of bubbles in the fluidized bed to vary the conditions of particle processing.

Processing particles may comprise a first phase with a first set of process parameters that cause a first configuration of the fluidized bed, and a subsequent second phase with a second set of process parameters that cause a second configuration of the fluidized bed that is different from the first configuration.

Processing particles may comprise a first, second and third phase, each of the first, second and third phase having different process parameters that cause different configurations of the fluidized bed.

At least one of the configurations may comprise configuring the bubbles to provide a dynamically structured fluidized bed, and another of the configurations may comprise an unstructured fluidized bed (e.g. in which the bubbles are not spatially periodic).

The first and second configuration may differ in at least one of: whether the bubbles are spatially periodic or spatially aperiodic, a mean or a standard deviation of bubble size, a mean or a standard deviation of bubble pitch or horizontal spacing, a mean or standard deviation of frictional stress experienced by the particles; a mean or standard deviation of the solids mixing or advection rate; and a gas flow rate.

The first and/or second configuration may comprise: i) a high gas flow without pulsation, sufficient to form an unstructured fluidized bed; ii) a pulsed gas flow sufficient to configure a homogeneous bubble flow within the fluidized bed in which bubbles are not spatially periodic (e.g. not arranged in a triangular tessellation); and iii) a pulsed gas flow configured to cause a dynamically structured bubble flow within the fluidized bed.

The gas flow may be pulsed at a frequency f between 1.1 and 5 times the natural frequency $f_n$ of the bed (or between 1.5 times and 3 times the natural frequency of the bed). The pulsed gas flow may have a minimum superficial gas velocity that is below the minimum fluidization velocity, and a maximum superficial gas velocity that is above the minimum fluidization velocity.

Processing the particles may comprise one or more of: particle coating, particle agglomeration, particle transformation (e.g. via a chemical reaction), particle drying, and use in catalysis.

According to a second embodiment, there is provided a particle processing apparatus comprising: a gas flow control valve; and a fluidized bed comprising; a chamber for receiving particles for processing; a plenum below the chamber configured to receive a pulsating gas flow from the gas flow control valve; a distributor plate separating the chamber from the plenum and configured to communicate a flow of gas from the plenum to the chamber; wherein the gas flow control valve is configured to pulse the gas flow to create dynamically structured bubble flow in a layer of particles within the chamber.

The apparatus may comprise more than one gas flow control valve.

The apparatus of the second aspect may be configured to perform the method of the first aspect, including any of the optional features thereof.

BRIEF DESCRIPTION OF THE DRAWINGS

Example embodiments of the invention will be described, with reference to the accompanying drawings, in which.

DETAILED DESCRIPTION

Gas pulsation introduces energy via the fluid-solid interaction force using a pulsed superficial gas velocity, u, which oscillates according to:

$$u=u_{min}+u_a[1+\sin(2\pi ft)] \quad (1)$$

where f is the frequency of the oscillation applied, $u_{min}$ is the minimum gas superficial velocity and $u_a$ is the amplitude of the pulse. The resulting time averaged velocity is $\bar{u}=u_{min}+u_a$. The sin function may be replaced (in both equation (1) and (2), below) with another periodic function with frequency f. For example, a square wave function can be used, in which a valve is switched between an open and closed state at the frequency f.

Equation (1) can be rewritten in terms of dimensionless velocities, after division by the minimum fluidization velocity $u_{mf}$ of the powder as $\hat{u}=u/u_{mf}$:

$$\hat{u}=\hat{u}_{min}+\hat{u}_a[1+\sin(2\pi ft)] \quad (2)$$

In a pulsed system, the gas fills interparticle voids and imposes drag directly and simultaneously onto all particles in the volume. Since it entails complex physics, gas-driven pattern formation is not as well understood. It has previously been shown that using an oscillating gas flow through a wide and shallow granular layer, patterns of a very similar nature to those obtained from mechanical vertical vibration are observed. As in mechanically vibrated systems, the wavelength of subharmonic squares and stripes decreases with increasing gas pulsation frequency. In fact, these features also follow behaviour consistent with a Faraday instability, whereby the wavelength of the spatial pattern is inversely proportional to the square of the perturbation frequency (see FIG. 1). More recently, it has been established that the response time of a collection of particles to a drag force must be linked to their size.

Pattern formation can be attributed to a secondary instability resulting from the propagation of voidage waves induced by the gas pulsation. A dimensionless hydrodynamic number can be used to describe the onset for gas-driven pattern formation in shallow layers of Geldart B particles.

$$\Gamma_{gs} = \frac{u_a}{u_t \overline{\phi}_s} \quad (3)$$

where $u_t$ is the terminal velocity of particles (used as a proxy for the particle response time), and $\overline{\phi}_s$ is the time-averaged solid fraction. A pattern arises beyond a critical amplitude and collapses below it, but, unlike vibrated layers, the critical amplitude depends strongly on the pulse frequency. A non-dimensional time scale may be used, whereby the pulse frequency is normalized with the system's natural frequency $f_n$ to define another parameter that takes into account the bulk dynamics of the layer.

The natural frequency of the system may be estimated from:

$$f_n = \frac{1}{\pi}\sqrt{\frac{g}{h_{mf}}} \quad (4)$$

which is based on approximating the system as an ideal liquid in a U-shaped tube of constant cross-sectional area, or from $$f_n = \frac{\sqrt{1-\zeta^2}}{2\pi}\sqrt{\frac{g}{h_{mf}}} \quad (6)$$

which treats the fluidized bed as a second-order damped vibrating system, where g is the gravitational acceleration, $h_{mf}$ is the height of the bed at the minimum fluidized state, and $\zeta$ is the damping factor associated with the system.

Figure 2:
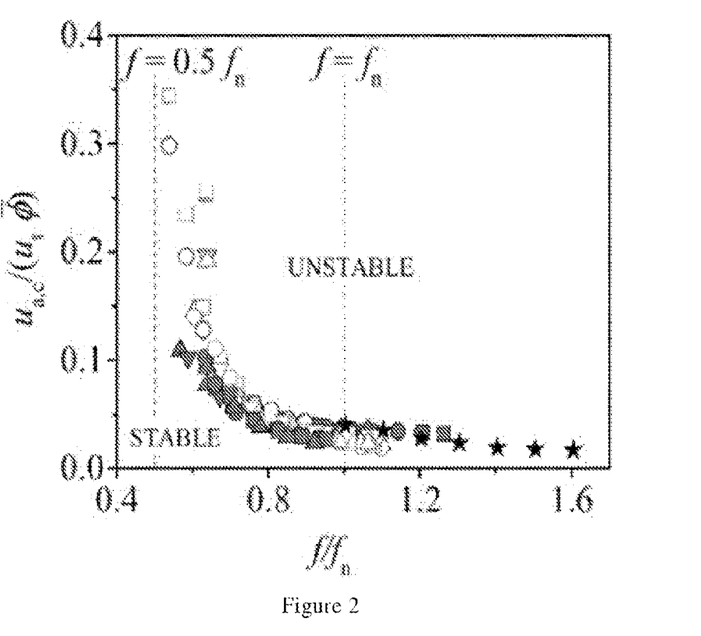
FIG. 2 shows a universal stability curve for pattern formation in shallow, 3D pulsed fluidized beds, of Geldart B particles under a pulsed flow with gas superficial velocity $u=u_{min}+u_a[1+\sin(2\pi ft)]$, where the amplitude $u_a$ that leads to the onset of pattern formation is denoted $u_{a,c}$. Particles include spherical glass beads of 130 μm diameter with $u_{min}=3$ or 4 cm/s ($\hat{u}_{min}=u_{min}/u_{mf}=2.5$ or 3.3) and height h=2-7 mm (white symbols), glass beads of 240 μm diameter with $u_{min}=3$ or 6 cm/s ($\hat{u}_{min}=0.75$ or 1.5) and h=3-7 mm (red symbols), and polystyrene particles with a diameter of 600 μm at $u_{min}=11.5$ cm/s and h=10 mm (stars).

Applying these dimensionless numbers, a universal instability curve can be drawn, describing the onset of pattern formation and separating two regimes, corresponding to stable and unstable patterns as shown in FIG. 2. The critical amplitude decreases dramatically when approaching $f/f_n \sim 0.5$, reaching a plateau for $f/f_n = 1$, which suggests a parametric resonance between the formation of kinematic waves and the bulk dynamics.

The same phenomenon is observed in 2D and 3D domains using different open source codes, such as MFIX and CFDEM.

Figure 3:
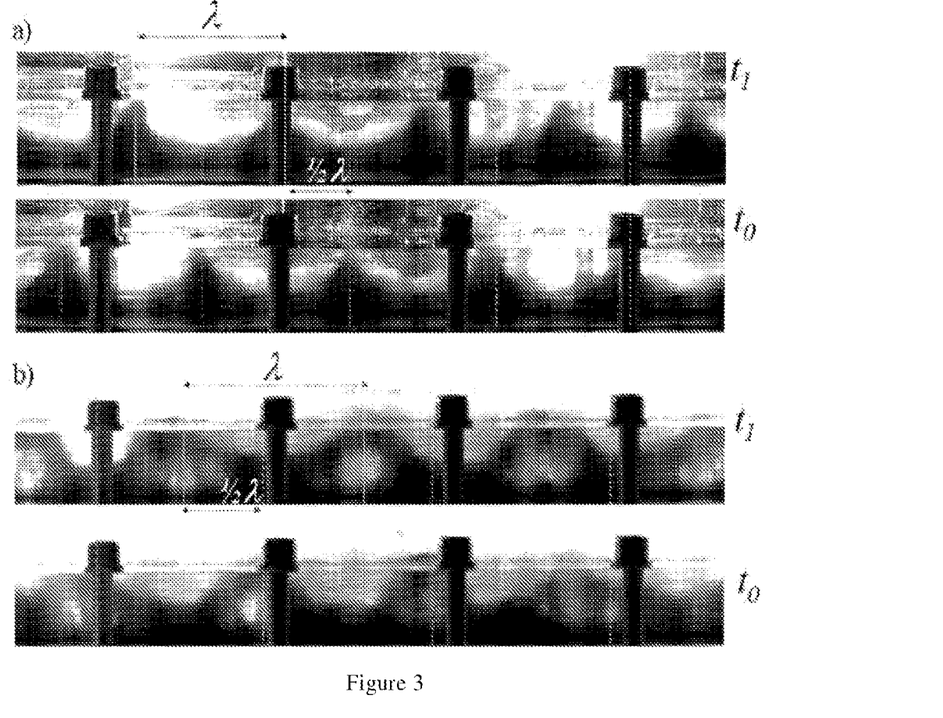
FIG. 3 shows transition from a surface wave to structured bubbling for increasing height, using 238 μm glass beads, with $u_{mf}=4.1$ cm/s. Top and bottom frames in both a) and b) show patterns formed during consecutive pulses, $t_0$ and $t_1=t_0+1/f$ with f=10 Hz. Dimensionless gas superficial velocity $\hat{u}=u/u_{mf}=1.0+2.0[1+\sin(2\pi 10\ t)]$ for bed heights h of (a) 7 mm (29 $D_p$) and (b) 1 cm (42 $D_p$).

Most of the time, the patterns that appear in a pulsed shallow layer collapse in a deeper bed, because the stresses created by the motion of the bubbles dominate the motion of the solids and supersede the surface wave created by the oscillations. However, under suitable conditions, both phenomena interact, and the solid circulation induced by the pulsation contains the primary hydrodynamic instability, preventing chaotic bubble motion. Bubbles are indeed created, but only at specific nodes and at specific times, self-organizing into a macroscopic pattern. FIG. 3 shows this incipient phenomenon in a shallow bed, transitioning from a surface wave to a bubbling bed, and FIG. 4 shows structured bubble flow resulting from pulsating gas flow with a relatively deep bed (189 $D_p$).

Within a specific, continuous range of $\hat{u}_{min}$, $\hat{u}_a$ and f, the bubble nucleation becomes reproducible and the bubbling fluidized bed is said to be "dynamically structured".

Gas bubbles are formed at specific nodes, spaced regularly by a characteristic transversal distance or wavelength $\lambda$, and a correlation appears between the nucleation sites in consecutive pulses, whereby the nodes in every pulse shift laterally by $\lambda/2$. Furthermore, this arrangement can propagate through a deep bed, leading to a fully predictable flow structure, where bubbles do not move laterally, coalesce or break. It is important to note that this phenomenon is not the result of a linear combination and propagation of waves in the domain.

Figure 4:
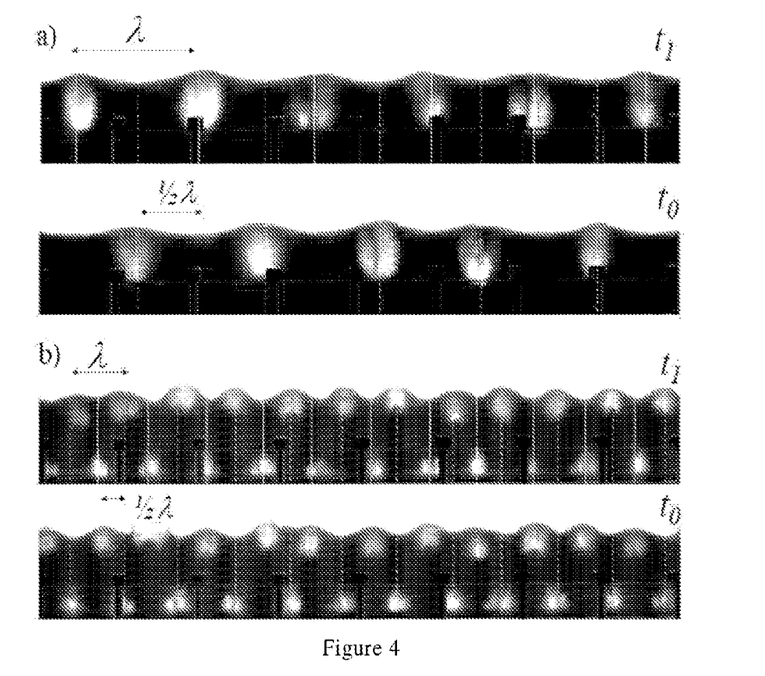
FIG. 4 shows structured flow of bubbles when pulsating the air flow, illustrating that the frequency affects the bubble size $D_b$ and the wavelength λ. The particles are 238 μm glass beads, with $u_{mf}=4.1$ cm/s. The stills show bubble patterns formed during consecutive pulses, $t_0$ and $t_1=t_0+1/f$. Bed height h of 4.5 cm (189 $D_p$) and non-dimensional gas superficial velocity $\hat{u}=u/u_{mf}=0.5+2.14[1+\sin(2\pi\ f\ t)]$ for (a) f=5 Hz, (b) f=7 Hz.
Figure 5:
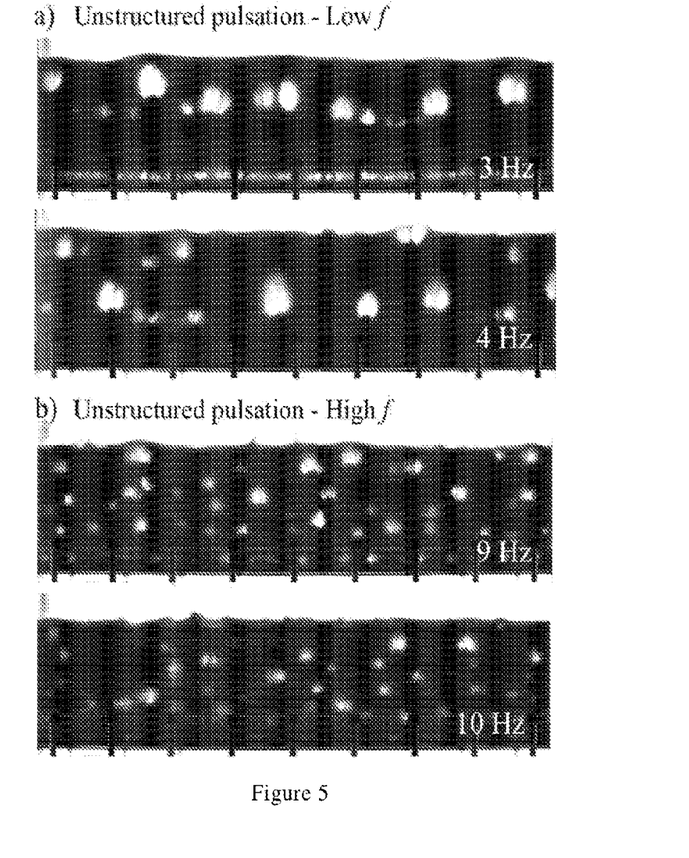
FIG. 5 shows an example of unstructured bubble flow under pulsation. The particles are 238 μm glass beads, with $u_{mf}=4.1$ cm/s. Bed height h of 10 cm (420 $D_p$) and dimensionless gas superficial velocity $\hat{u}=u/u_{mf}=0.5+1.75\ [1+\sin(2\pi\ f\ t)]$ for (a) low f=3-4 Hz, (b) high f=9-10 Hz.

FIGS. 3, 4, and 5 show examples of bubble dynamics for different pulsating frequencies f. In this case, the natural frequency, $f_n$, computed from Eq. (4), is 3.1 Hz, and the pressure signal shows a maximum spectral density within a range of 2.5 to 6 Hz. When operating at the lower end of this range of f, 3-4 Hz, bubbles stagger in separate rows in response to each pulse, but their spatial distribution remains unstructured in the horizontal direction: they move laterally, coalesce and break, rising at different velocities. When operating at higher frequencies f, say 9 or 10 Hz (as shown in FIG. 5), much smaller bubbles emerge that are spatially randomly distributed, in a comparable way to a fluidized bed under constant gas flow. The use of pulsation at such frequencies could improve the performance of fluidized bed processes, because it reduces bubble size and enhances the powder flowability, by introducing a new source of stress in the solid phase. However, one loses control over the bubble size and, as a consequence, any ability to manipulate mixing and transport. Therefore, while operating in the unstructured regime might still offer benefits, it lacks general applicability and involves uncertainties in design and scale-up. The optimal conditions to pulse a bed in order to homogenize bubbling are system and scale-dependent, e.g., due to their association to the bed's natural frequency.

Earlier, in Equation (3) and FIG. 2, it was shown how patterns in a shallow layer emerge beyond a certain threshold, which is a function of the response time of the solids phase, and is characterized by the terminal velocity of the particles, $u_t$. For a shallow layer of height, h, fluidized by a pulsating flow over a minimum flowrate, $u_{min}$, and frequency, f, a regular surface wave emerges above a critical pulsation amplitude, $u_{a,c}$, and collapses only at large amplitudes. Bubble patterns in deeper layers behave differently: a stable pattern emerges only within a moderate range of f and $u_a$. Outside of this domain, bubbling progresses in a chaotic manner, similar to the operation at constant gas velocity. Within it, a reproducible pattern emerges, and key features, such as bubble size and separation become strongly correlated and are a function of the pulsation characteristics. Crucially, changes in frequency f and amplitude $u_a$ allow one to change the way the gas is allocated into bubbles, across a finer or coarser lattice, which affects both the pattern wavelength and bubble size.

Figure 1:
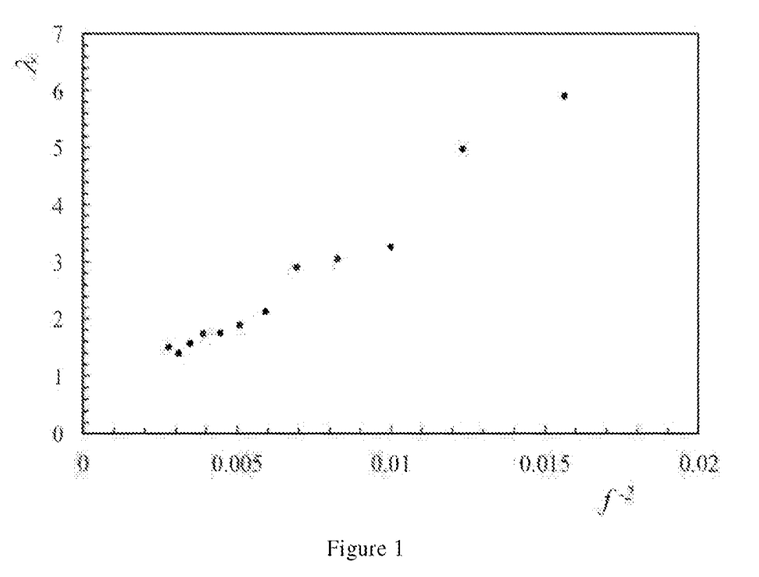
FIG. 1 shows variation of the wavelength of surface features in shallow 3D granular layers of 238 μm glass beads under a pulsed gas flow. Experiments were carried out in a cylindrical bed of 14 cm diameter, height h=3 mm (12 $D_p$), dimensionless gas superficial velocity $\hat{u}=u/u_{mf}=0.6+0.8[1+\sin(2\pi ft)]$.

In vibrating and pulsed shallow layers, the wavelength λ is inversely proportional to the square of the reciprocal of the frequency, $f^{-2}$ (FIG. 1). A macroscopic bubble pattern shows the same qualitative trend, whereby an increase in f reduces the separation between bubbles, λ (as shown in FIG. 4). However, the phenomenon is no longer directly comparable to a Faraday instability, due to the complex flow involved in the rearrangement of the bubbles. Changes in f and $u_a$ condition the amount of air that is injected in every pulse and, with it, $D_b$ and λ. The average flowrate, $\bar{u}=u_{min}+u_a$, on the other hand, determines the position of the oscillation relative to the minimum fluidization velocity, $u_{mf}$, and, hereby, the amount of gas that is injected in the bubbles or the emulsion phase.

Figure 6:
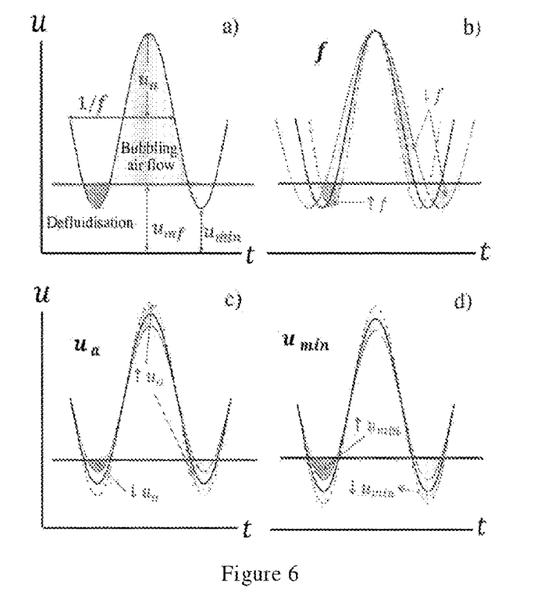
FIG. 6 shows a schematic representation of the evolution of the gas superficial velocity u, during one and a half period of the gas pulsation, for a given minimum gas velocity, $u_{min}$, amplitude, $u_a$, and frequency, f; (a) When $u>u_{mf}$, i.e., $\hat{u}>1$, gas is injected into the bubble phase, while there is partial defluidization during the time interval when $u<u_{mf}$, i.e., $\hat{u}<1$. Depiction of the lengths of the time intervals and the quantities of gas in excess or in deficit with respect to $u_{mf}$ with changes in (b) f, (c) $u_a$, and (d) $u_{min}$.

FIG. 6 illustrates this critical factor in the stability of a bubble pattern. Oscillations where the superficial velocity of the gas, u, is maintained above the minimum fluidization velocity, $u_{mf}$, i.e., $\hat{u}_{min}>1$, do not allow the propagation of a bubble pattern, at least in the study of monodispersed glass beads. It is necessary for the bed to temporarily defluidize. However, it is essential to realize that the system is inherently dynamic. Due to the persistent oscillation of the gas flow, it is constantly pushed out of equilibrium, creating simultaneous fluid-like like and solid-like zones at all times—thus, even if the velocity temporarily drops below $u_{mf}$, many particles remain in motion. Computational work and PTV (particle tracking velocimetry) analysis of ultra-high speed videos have associated bubble self-organisation to the creation of intermittent locally dense areas in the bed that restrict the solid circulation. These areas form between each pair of bubbles where the solid flow converges, creating a jammed solid-like obstruction that prevents the lateral mixing. The stability of this pattern depends on the pulsation characteristics, f, $u_{min}$ and $\hat{u}_a$, because they determine the relative size of the fluidization and defluidization cycles.

Figure 7:
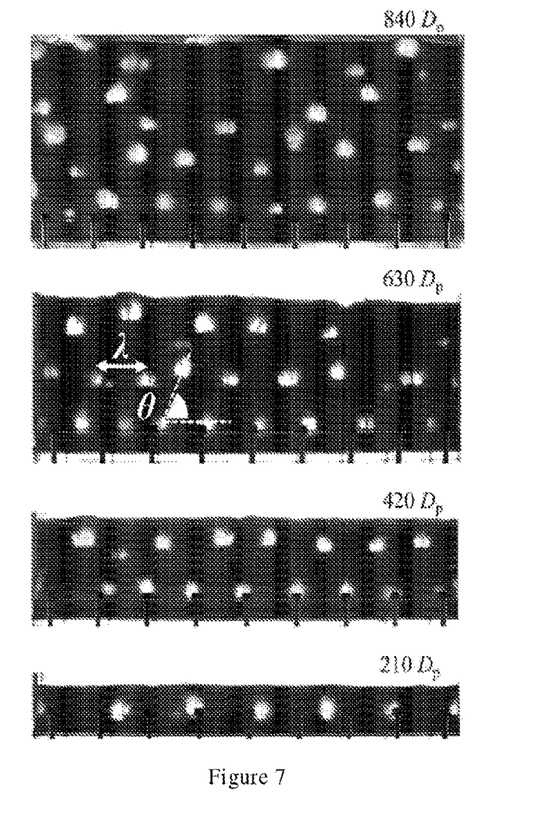
FIG. 7 shows an example of a structured bubble flow under pulsation. The particles are 238 μm glass beads, with $u_{mf}=4.1$ cm/s and dimensionless gas superficial velocity $\hat{u}=u/u_{mf}=0.5+1.75\ [1+\sin(2\pi\ f\ t)]$. Bottom to top shows beds of increasing height h of 5 cm (210 $D_p$), 10 cm (420 $D_p$), 15 cm (630 $D_p$), 20 cm (840 $D_p$).

FIG. 7 presents some examples of well-structured flows, including regular bubble patterns. Similar patterns can be obtained within a range of f, $\hat{u}_{min}$ and $\hat{u}_a$ for glass beads of different sizes, ranging from 128 to 475 μm, but their stability varies. Some operating conditions lead to some spatial fluctuations in the initial bubble size, which occasionally causes bubbles to move laterally. This affects the motion of neighbouring bubbles, and leads to overall variability in the pattern's structure, bubble size and velocity, but not to the point of causing coalescence or breakup, and distorting the pattern completely. Similarly, patterns become less stable higher up in the bed.

Bubbles naturally grow and accelerate when they move up, so that the polar angle θ of the lattice increases axially (see FIG. 7). The relationship between λ and $D_b$ shown in FIG. 7 implies that there must be a specific inter-bubble distance and wavelength λ associated to a horizontally aligned array of bubbles of size $D_b$. As $D_b$ increases in the upper part of the bed, bubbles find themselves arrayed with an "incorrect" wavelength, which is visible in the top image of FIG. 7, and so they are forced to move laterally, introducing defects in the overall structure. Often, one bubble breaks and one of its daughters accelerates, moving diagonally upwards to a nodal position in a row above it. In the top region of a deep bed or away from the optimal conditions, these defects multiply, making the structure less reproducible and, eventually, indistinguishable from the operation of traditional operations, pulsed or not.

Figure 8:
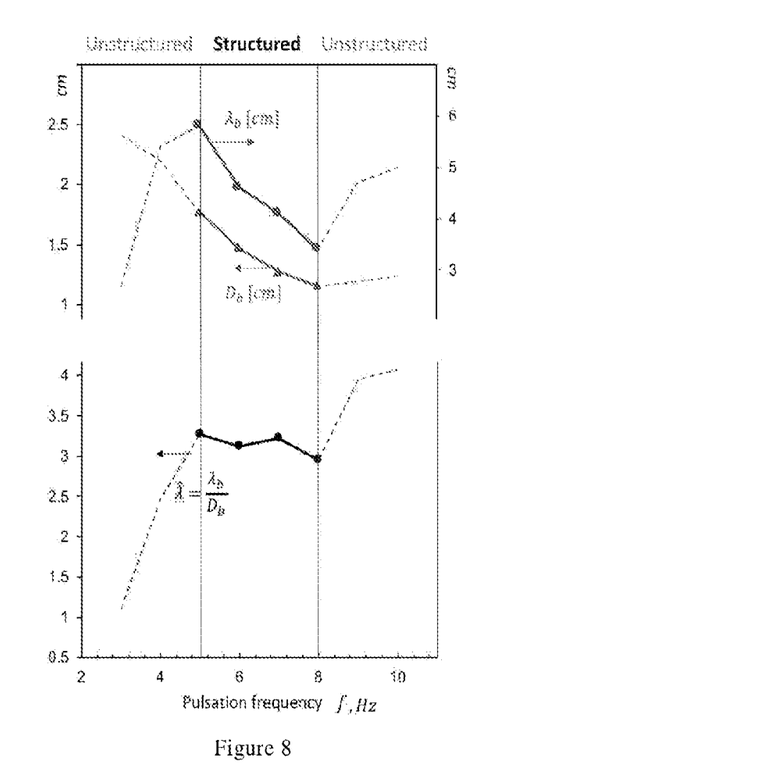
FIG. 8 shows manipulation of bubble size and wavelength via pulsation frequency. Bed height h of 10 cm. The particles are 238 μm glass beads, with $u_{mf}=4.1$ cm/s and dimensionless gas superficial velocity $\hat{u}=u/u_{mf}=0.5+1.75\ [1+\sin(2\pi\ f\ t)]$.

FIG. 8 illustrates the ability to control the bubble dynamics. It shows how the bubble size, $D_b$, and horizontal separation or wavelength, $\lambda_b$, evolve under conditions leading to structured and unstructured flows. For a given $u_a$, $D_b$ decreases monotonically with increasing f until it plateaus at high frequency in an unstructured operation (here, f>8 Hz). In addition, at higher frequencies, the bubble size, $D_b$, becomes comparable to that observed in a fluidized bed at the same time-averaged, constant flow. Within the window of conditions leading to dynamic structuring (5 to 8 Hz), the self-organization of the bubbles into a pattern establishes a correlation between $\lambda_b$ and $D_b$, forming a stable structure with an almost constant non-dimensional wavelength $\hat{\lambda}_b=\lambda_b/D_b$. In this way, under a structured operation one gains direct control over the bubble size and the separation, whereas, under unstructured pulsation, both vary independently and display a much broader distribution.

Figure 9:
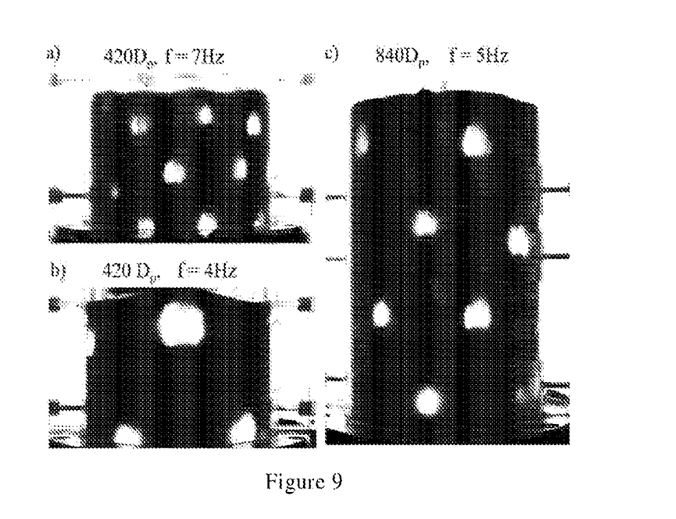
FIG. 9 shows an example of a structured bubble flow under pulsation in an annular bed. The particles are 238 μm glass beads, with $u_{mf}=4.1$ cm/s in beds of height 10 cm (420 $D_p$) (a and b) and 20 cm (840 $D_p$), with a dimensionless gas superficial velocity of (a) $\hat{u}=u/u_{mf}=0.5+1.75\ [1+\sin(2\pi\ 7\ t)]$, (b) $\hat{u}=u/u_{mf}=0.5+1.75\ [1+\sin(2\pi 4\ t)]$, and (c) $\hat{u}=u/u_{mf}=0.5+1.75\ [1+\sin(2\pi\ 5\ t)]$.

It is worth emphasizing that the presence of the sidewalls does not support the pattern formation, contrary to linear standing waves, nor is 2D transport of the stress in the solid phase responsible for a pattern to emerge. In shallow beds, the pattern is independent of the container's shape. Square patterns can be produced in a bed with a cylindrical perimeter wall. Regular bubble patterns similar to the ones in FIG. 7 have been produced experimentally by inventors in deep, annular, cylindrical beds, which amounts to having no sidewalls, but periodic boundaries, as shown in FIG. 9. Despite the notable effects of curvature on the bubble nucleation and the stability of the pattern, a dynamically structured flow can be obtained up to, at least, a similar height as in a deep, flat vessel with a width equal to circumference of the annular bed.

By fine tuning the pulsation characteristics, it is possible to further extend the height up to which patterns persist in such structured beds. To do so, however, it may be useful to obtain a direct characterization of the solid flow patterns to understand the interaction between different bubble arrays. For practical applications, fully 3D patterns may be realised. Lateral and axial baffles may be used to either stabilize a 3D pattern or otherwise design a collection of (quasi) 2D patterns in a compartmentalized fashion.

Dynamically structured beds, as described herein, may be considered as having conditions somewhere between those of a fixed bed and a fluidized bed. They offer three main advantages.

First, dynamically structured beds can mix a powder operating at very low gas flowrate.

Figure 10:
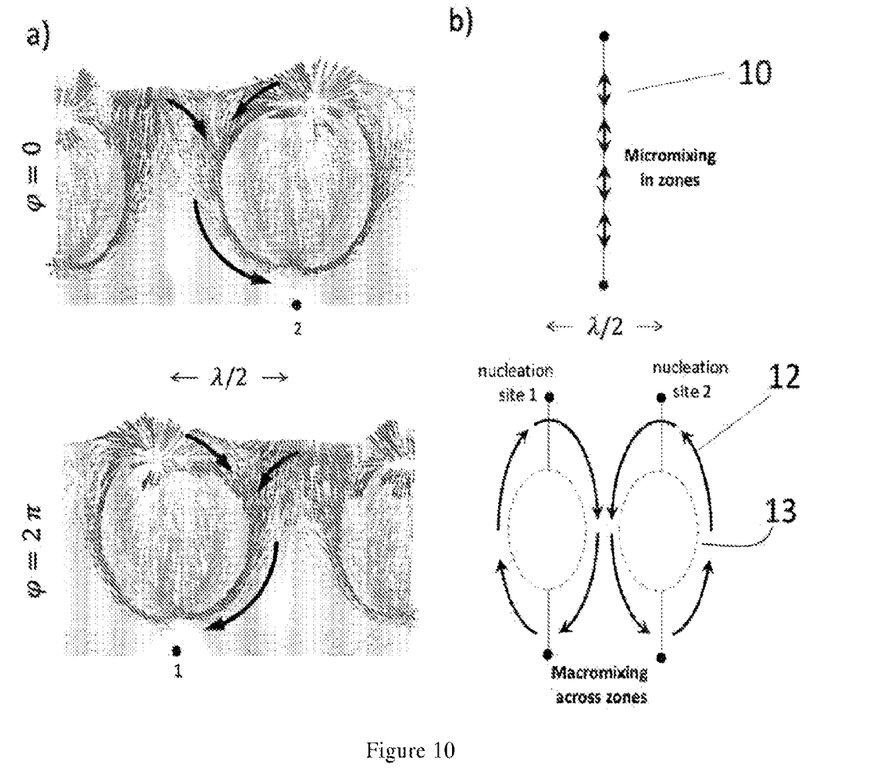
FIG. 10 shows solid flow compartmentalization. (a) CFD-DEM simulation. Solid circulation in two consecutive pulses at phase angle φ=0 and φ=2π. Vectors delimit the local solid velocity (white, scaled down×4). Color marks the direction of lateral particle velocity, $v_x$ ($v_x<0$ green, $v_x>0$ orange). (b) Resulting mixing patterns within the zone delimited by the bubble nucleation sites: particles mix axially within each zone, during each pulse, and zones interact within a fixed circulation loop.

Second, the pattern creates a compartmentalized flow, where the circulation of the solids is completely driven by the motion of adjoining bubble pairs. The compartmentalised flow structure decouples micromixing within each compartment, from long-range circulation or macromixing through the interaction of compartments. FIG. 10 illustrates the zones and the mixing patterns extracted from the analysis of CFD-DEM simulations, which can be divided into mixing locally within the compartment and mixing between compartments in loops that are determined by the bubble pattern. The entire solid phase follows the exact same array of circulation loops and, as a result, particle history is purely dominated by the scale of the pattern, that is, the bubble size and separation. FIG. 10 shows micromixing 10 within the compartment and macromixing 12 across zones due to the interaction of circulation loops associated with regions between each pair of adjacent bubbles 13 in the pattern.

Finally, in contrast to a typical pulsed bed, a dynamically structured bed is scalable and responsive. The scale of the pattern can be manipulated externally using the pulsation characteristics, and, in this way, define the solid circulation and the gas-contact pattern.

These three features open the way for alternative designs in a range of processes. Because mixing in dynamically structured beds are typically associated with low slip velocities, heat and mass transport rates are likely to be below those in a traditional, vigorously bubbling (unstructured) fluidized bed. Therefore, dynamically structured units may be less applicable as systems currently operating at very large gas velocities, such as circulating fluidized beds. However, a dynamically structured bed according to an embodiment may drastically reduce attrition, entrainment and the use of gas, while still ensuring local mixing, which can prove valuable in the intensification of processes involving high-value, toxic or dangerous particulate materials.

In the context of reaction engineering, operation in a fixed particle bed allows for high slip velocities without entrainment of particles in the gas flow, but the lack of particle mixing can lead to heterogeneity. A fluidized bed normally yields homogeneous mixing at the cost of attrition, entrainment and a lower conversion and selectivity. A dynamically structured bed may be particularly applicable for systems with requirements between these extremes, where the use of gas and the loss of material must be minimized, but that still require a certain degree of mixing to ensure a homogeneous temperature and, critically, to reduce external transfer limitations by controlling sintering and agglomeration of the solids.

Figure 11:
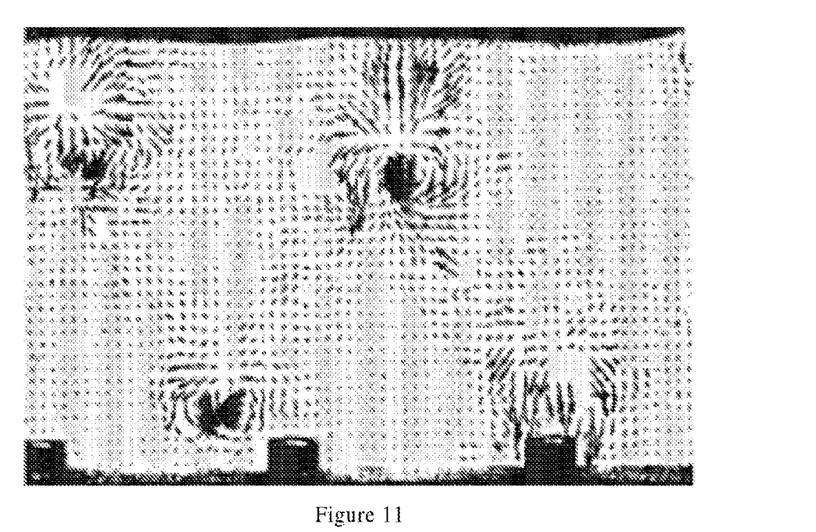
FIG. 11 shows experimental solid flow patterns in a pseudo-2D dynamically structured bed. Data from PTV analysis of high-speed videos. Arrows indicate the direction of the solid velocity. Areas of low velocity are shaded in grey. Bed height h=10 cm. The particles are 238 μm glass beads, with $u_{mf}=4.1$ cm/s and dimensionless gas superficial velocity $\hat{u}=u/u_{mf}=0.5+1.25\ [1+\sin(2\pi\ 5\ t)]$.

In addition, the possibility to control solid mixing at low velocity can improve the energy efficiency of processes operating at low heat and mass transport rates, such as, for example, a solar irradiated fluidized bed collector, or lead to the design of new transport devices. The second feature, of compartmentalised flow, tends to lead to a very precise particle history, as illustrated in FIG. 11. This makes a dynamically structured bed of particular applicability for the intensification of particle formation units, such as dryers, mixers, coaters and agglomerators in the consumer goods industry, from pharmaceuticals to foods.

The ability to establish a narrow particle stress distribution may result in better control over dispersion and drying of binders, and particle breakage and growth processes. Finally, the responsive nature of these beds, illustrated in FIG. 8 (showing that bubble size and pitch are responsive to process conditions), could allow for multistage processes, in which the same fluidized bed transitions seamlessly across vastly different regimes. One can envisage the same bed moving from an unstructured fluidized bed with high velocity gas flow to maximize heat transfer at one stage (i.e. $1^{st}$ stage of drying), to an unstructured used of pulsation to maintain homogeneity and reduce attrition (i.e. $2^{nd}$ stage of drying when particles have become brittle) to a dynamically structured operation to gain a tight control of solid mixing (i.e. coating or $3^{rd}$ stage of drying, when drying becomes dominated by internal diffusion).

Figure 12:
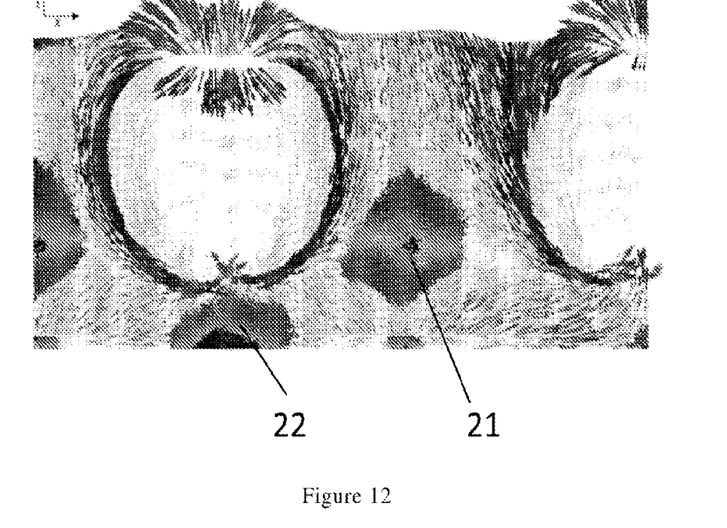
FIG. 12 shows CFD-DEM of a structured flow. The areas of high non-dimensional particle velocity magnitude, $\hat{v}=v/d_p$, are marked with velocity vectors, for $\hat{v}>100$ (white arrows in the bubble, scaled down 4 times) and for $10<\hat{v}<100$ (coloured arrows elsewhere). Areas of very low velocity are marked with particles for $1<\hat{v}<10$ (color), and $\hat{v}<1$ (black). The color of particles, arrows and background indicates the direction of the axial particle velocity, $v_z$ (blue: downwards, with $v_z<0$; white: $v_z\sim0$, and red: upwards, with $v_z>0$). Particles are 238 μm glass beads under a dimensionless gas superficial velocity of $\hat{u}=u/u_{mf}=0.5+2.14\ [1+\sin(2\pi\ 5\ t)]$. The simulation domain shown is 10 cm wide by 4.5 cm high, and its thickness is 0.2 cm.

The possibility to control mixing is related to the self-organization of the bubbles and the resulting solid circulation. This phenomenon is in turn a direct consequence of the high solid fractions achieved during the gas pulsation. Sections of the bed in the wake of the bubbles and in between each pair of bubbles transition intermittently to a quasi-static granular flow, becoming jammed in frictional contact. In doing so, they create an obstacle (labelled 1 and 2 in FIG. 10) that impedes the circulation of solids across the bed. These structures have been investigated in small systems, both experimentally, for example as shown in in FIG. 11, and computationally, as shown in FIGS. 10 and 12.

The bubbling dynamics described herein is a scale independent phenomenon. It does not rely on the interaction with the side boundaries, but on the collective motion of the bubbles. The bed alternates its behaviour between fluid-like and solid-like. During the valley in each period of the sinusoidal flow of the gas, the bulk of the powder momentarily defluidizes, but the bubbles continue to rise toward the surface, which drives the flow of solids around them. The solids at the top of the bed are pushed towards the sides, colliding vigorously with each other, thus dissipating kinetic energy, and creating a dense area where they encounter the rising solids (central region 21 of low particle velocity in FIG. 12). The particles drawn from the space in between both rising bubbles at the lower section and into the bubble wakes concentrate and create a dense area that becomes almost stagnant on top of the distributor (lower left region 22 of lower particle velocity in FIG. 12).

In every pulse, a horizontal channel forms near the distributor and splits into bubbles when the gas velocity starts to decrease. The breakage process is then conditioned by the stresses caused by the wakes of the preceding array of bubbles. The pyramid-shaped solid regions in the wake of each bubble shown in FIG. 12 are consolidated by the solid circulation induced by the array of bubbles. The solid flow creates a downwards compressive stress causing the presence of the bubble to exert an additional pressure onto the distributor plate. This resistance counters the drag force exerted by the fluid, so that the gas slug created in the following pulse tends to accumulate gas in the spaces left in between the dense areas left behind the previous bubbles' wakes, and in this way forms a new set of bubbles staggered in between the previous ones.

Provided the bubbles formed are of the same size, the dense areas created in their wakes are equally spaced, which eventually leads to two possible sets of nucleation sites that alternate in every pulse to form the observed pattern. Large bubbles are robust and rise fast, causing a rapid solid circulation in their proximity and large dense regions in their wake. Therefore, they stabilize in a pattern of a large wavelength, whereas small bubbles drive less solid around them and, therefore, become closely spaced, which makes them more sensitive to unbalance.

Gas pulsation can be effectively used to alter the bubbling dynamics in a fluidized bed and create reproducible, scalable, macroscopic flows. Furthermore, in such dynamically structured fluidized beds, the size and separation of the bubbles can be externally controlled by changing the constant and pulsating components of the inlet gas flow. This provides an unprecedented level of control over the circulation in a gas-solid fluidized bed. Embodiments can bridge the behaviours associated with fixed and fluidized beds, separating micro- from macromixing. An example of dynamic self-organization, which is a universal structuring mechanism in natural systems, dynamically structured fluidized beds take advantage of the structuring induced by fluctuations in energy input and dissipation in a nonlinear system. This is very useful for practical applications, as the desired level of mixing between different species and the gas-solid contact time can be tightly controlled, which is important in coating, drying, granulation or catalytic processes. Beyond the optimization and intensification of current operations, embodiments may open the way to entirely new application areas, benefitting from features of both fixed and fluidized beds.

Figure 13:
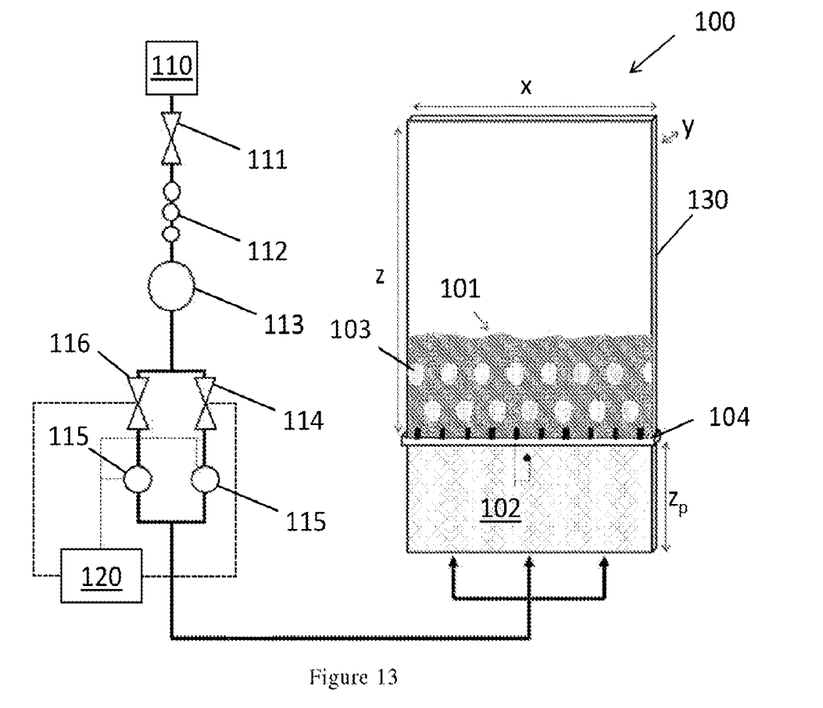
FIG. 13 is an example of fluidised bed system according to an example embodiment.

An example of a fluidized bed system 100 according to an embodiment, operable to perform the methods described herein, is shown in FIG. 13. A quasi-2D fluidized bed 130 is shown, comprising walls that are spaced apart to define a thickness y of the bed. The depth of powder 101 in the z direction defines the depth of the bed. The lateral dimension of the bed 130 is wider than the y dimension, by at least a factor of 5, and preferably by at least a factor of 10. The bed 130 further comprises a distributor 104 and a plenum 102. The plenum 102 receives a modulated gas flow that comprises a fixed flow component and time varying flow component (e.g. in accordance with equation (2)). The distributor 104 could be a porous plate and comprises in general a plurality of openings or nozzles 105 configured to communicate gas from the plenum 102 to the powder bed. Bubbles 103 are created in the powder bed. As already described, the bubbles may comprise a structured arrangement of bubbles, and control over the structure of the bubble pattern may be achieved by varying the parameters of the gas flow into the plenum.

In certain embodiments the distributor 104 may be configured to cause an even pressure drop, such that it, macroscopically, differs less than 10% across 90% of the area of the distributor.

The system 100 further comprises a gas source 110, main valve 111, filters 112, reservoir 113, solenoid valve 114, needle valve 116, mass flow meters 115 and controller 120. The main valve 111 is configured to isolate the rest of the system from the process gas source 110. The filters 112 are configured to remove potential contaminants from the process gas. The reservoir 113 may act as a buffer between the process gas source and the rest of the system 100. The needle valve 116 is configured to provide the DC component of process gas flow to the plenum 102, and is controlled by the controller 120. The solenoid valve 114 is configured to provide the pulsatile component of the process gas flow to the plenum 102, under the control of the controller 120. In other embodiments, a different arrangement may be used to cause the gas flow pulsatile (e.g. in accordance with equation (2)).

The controller 120 may be responsive to the mass flows measured by the meters 115 to provide a suitable combined mass flow from the needle valve 116 and solenoid valve 114. Variation of the mixing conditions within such a system can be achieved by varying control signals provided to the valves 114, 116. For example, a high flow, non-pulsatile flow condition can be used to create a typical (unstructured/chaotic) fluidized bed, which may be used to dry a wet product. A pulsatile flow may be used to reduce stresses on the particles, improve homogeneity and limit external heat transfer limitations breading clusters if the powders and binders start to agglomerate. A structured bubble flow may be provided by a pulsatile flow as described herein (e.g. with an appropriate frequency and a flow low enough gas flow that the minimum superficial gas velocity is below the fluidisation velocity).

Figure 14:
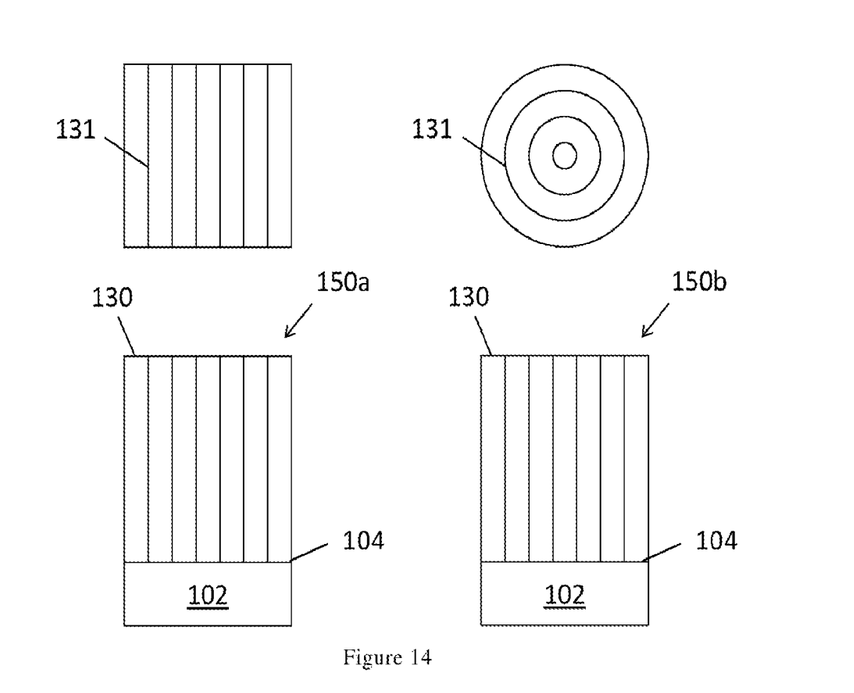
FIG. 14 is an example of a fluidized bed systems comprising baffles according to embodiments.

In certain embodiments, a larger bed may be formed by stacking adjacent quasi-2D beds, to form a larger bed. Such an approach allows scaling of the advantages of structured bubble flow described herein so that it can be applied to an industrial scale process. Alternatively, a large bed may be subdivided by baffles 131 to form a series of smaller quasi-2D bed portions. FIG. 14 illustrates a bed 150a comprising for a rectangular bed portions and a bed 150b comprising annular bed portions (right).

Such bed comprising a plurality of quasi-2D bed portions has the ability to transition seamlessly between different mixing conditions. It could operate as a normal fluidized bed (with vigorous mixing in a collisional flow regime that maximises heat and mass rates, but also creates large stresses on particles and, as a result, attrition and elutriation), all the way to the opposite extremes in a slow structured frictional flow that mixes the powder slowly, reducing heat and mass transfer but controlling the stress. The transition can be done without internals, in the same vessel, simply actuating the control valves of the gas line to tune the pulsation characteristics. An example would be (i) starting as a typical fluidized bed to dry a wet product (high air flow and no pulse) to (ii) operating under a traditional pulsating flow (reduced velocity and high frequency pulse) to reduce stresses, improve homogeneity and limit external heat transfer limitations breaking clusters if the powders and binders start to agglomerate to (iii) a "structured" regime of controlled particle stresses (reducing gas flow velocity drastically under specific periodic signals) performing a subsequent agglomeration or coating step.

Figure 15:
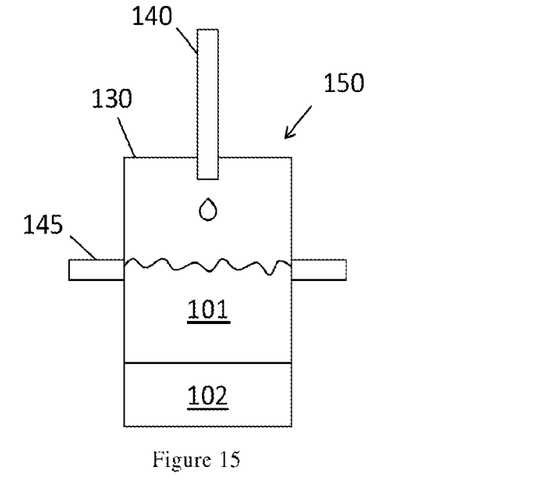
FIG. 15 is an example embodiment of a fluidized bed system comprising means for continuously adding particles for treatment and recovering particles that have been treated.

In certain embodiments, particles/powder may be added to a bed (or each bed portion) in a central region of the bed. FIG. 15 shows an example embodiment of a bed 150, in which a powder feed 140 is introducing powder to be processed at the centre of the bed, and a powder collection means 145 is provided at the edges of the bed 150 to collect processed powder 101.

In certain embodiments a liquid may be introduced, for example by top down spraying using a nozzle in a similar position to the powder feed 140 in FIG. 15.

In certain embodiments, different powders or liquids may be added at different positions in the bed, dependent on their required mixing time. Powders or liquids that require long mixing times may be added nearer to the centre of the bed, and powders or liquids that require shorter mixing times may be added nearer to the edge of the bed. More than one addition point may be provided, so that more than one powder or liquid is introduced at different positions.

Although specific examples have been described, the skilled person will appreciate that variations are possible, within the scope of the appended claims. The scope of the invention should be determined with reference to the appended claims, and any variations included within their scope.

What is claimed is:

1. A method of operating a gas-solid fluidized bed, comprising:
   flowing a pulsating gas flow upwards through a bed of solid particles from a distributor to cause a dynamically structured bubble flow; and
   processing particles using the fluidized bed,
   wherein processing particles using the fluidized bed comprises setting up a compartmentalized flow regime, in which a plurality of mixing compartments are defined between adjacent bubbles arranged in a triangular tessellation, and particles are mixed by a combination of i) recirculating axial mixing within the compartment with a residence time between 0.1 and 200 s and ii) the controlled advection of particles between compartments at a time averaged rate between 0.01-250 litres solid particles/m$^2$ s.

2. The method of claim 1, wherein the mixing locally within a compartment comprises mixing with a quasi-static granular flow region in the wake of each bubble defining the mixing compartment.

3. A method of operating a gas-solid fluidized bed, comprising:
   flowing a pulsating gas flow upwards through a bed of solid particles from a distributor to cause a dynamically structured bubble flow; and
   processing particles using the fluidized bed,
   wherein processing the particles comprises controlling gas-solid contact time by adjusting the spacing and size of gas bubbles, so that the linear span of the area-based distributions of the bubble size and the horizontal spacing between adjacent bubbles in the fluidized bed may be less than 1.5 and 1.75, respectively.

4. A method of operating a gas-solid fluidized bed, comprising:
flowing a pulsating gas flow upwards through a bed of solid particles from a distributor to cause a dynamically structured bubble flow; and
processing particles using the fluidized bed,
wherein a time averaged exchange rate between an emulsion phase of the bed and a bubble phase of the bed is between 0.1 and 500 litres$_{solid\ particles}$/m2s.

5. A method of operating a gas-solid fluidized bed, comprising:
flowing a pulsating gas flow upwards through a bed of solid particles from a distributor to cause a dynamically structured bubble flow; and
processing particles using the fluidized bed,
wherein processing the particles comprises controlling the stress experienced by each particle by adjusting the spacing between and size of gas bubbles, so that the standard deviation of stress experienced by each particle in the bed is less than 50% of the median stress.

6. A method of operating a gas-solid fluidized bed, comprising:
flowing a pulsating gas flow upwards through a bed of solid particles from a distributor to cause a dynamically structured bubble flow; and
processing particles using the fluidized bed,
wherein the bed is provided with one or more baffles that divide the bed into a plurality of vertical particle bed portions, wherein each bed portion has a thickness, normal to the baffle and less than twice the horizontal spacing between bubbles.

7. The method of claim 6, wherein a lateral extent, normal to the thickness and along the horizontal direction, of the quasi two-dimensional particle bed portion is at least five times the thickness of the bed portion and/or a depth of the quasi two-dimensional particle bed portion is at least five times the thickness of the bed portion.

8. The method of claim 6, wherein at least one of:
i) the baffles are curved or flat;
ii) the baffles extend through only part of the depth of the bed; and
iii) the baffles extend downwards from the top surface of the bed.

9. A method of operating a gas-solid fluidized bed, comprising:
flowing a pulsating gas flow upwards through a bed of solid particles from a distributor to cause a dynamically structured bubble flow; and
processing particles using the fluidized bed,
introducing solid particles to the bed while the bed is fluidized, and/or recovering processed particles from the bed while the bed is fluidized,
wherein the fluidized bed is rectangular, and solid particles are added in a central region of the fluidized bed, and/or lateral positions following the advection of particles from the centre outwards and/or processed particles are recovered at an edge region of the fluidized bed.

10. A method of operating a gas-solid fluidized bed, comprising:
flowing a pulsating gas flow upwards through a bed of solid particles from a distributor to cause a dynamically structured bubble flow; and
processing particles using the fluidized bed,
wherein processing particles comprises adjusting a gas flow to manipulate the flow regime of bubbles in the fluidized bed to vary the conditions of particle processing;
and wherein processing particles further comprises a first phase with a first set of process parameters that cause a first configuration of the fluidized bed, and a subsequent second phase with a second set of process parameters that cause a second configuration of the fluidized bed that is different from the first configuration.

11. The method of claim 10, further comprising adding a liquid to the fluidized bed, and wherein the particle processing further comprises contacting the particles with the liquid, wherein adding the liquid comprises spraying the liquid onto the fluidized bed.

12. The method of claim 11, wherein the liquid comprises a binder or a coating material.

13. The method of claim 10, wherein the first and second configuration differ in at least one of: a bubble size, a bubble spacing, a mean frictional stress experienced by the particles; a mixing rate; and a gas flow rate.

14. The method of claim 10, wherein the first and/or second configuration comprise one of:
i) a gas flow without pulsation, sufficient to form an unstructured fluidized bed;
ii) a pulsed gas flow sufficient to configure an homogeneous bubble flow within the fluidized bed in which the bubbles are not spatially periodic; and
iii) a pulsed gas flow configured to cause a dynamically structured bubble flow within the fluidized bed.

15. A method of operating a gas-solid fluidized bed, comprising:
flowing a pulsating gas flow upwards through a bed of solid particles from a distributor to cause a dynamically structured bubble flow; and
processing particles using the fluidized bed,
wherein the gas flow is pulsed at a frequency f between 1.5 and 5 times the natural frequency $f_n$ of the bed, and the pulsed gas flow has a minimum superficial gas velocity that is below the minimum fluidization velocity, and a maximum superficial gas velocity that is above the minimum fluidization velocity.

16. The method of claim 15, wherein processing the particles further comprises one or more of: particle coating, particle agglomeration, particle transformation, particle drying, and use in catalysis.

* * * * *